(12) United States Patent
Petersen et al.

(10) Patent No.: US 10,941,841 B2
(45) Date of Patent: Mar. 9, 2021

(54) TRACTION TRANSMISSION AND DRIVE UNIT FOR A MOTOR VEHICLE

(71) Applicant: VOLKSWAGEN AKTIENGESELLSCHAFT, Wolfsburg (DE)

(72) Inventors: Rainer Petersen, Wolfsburg (DE); Jörg Möckel, Sassenburg (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 139 days.

(21) Appl. No.: 16/464,994

(22) PCT Filed: Nov. 15, 2017

(86) PCT No.: PCT/EP2017/079335
§ 371 (c)(1),
(2) Date: May 29, 2019

(87) PCT Pub. No.: WO2018/099722
PCT Pub. Date: Jun. 7, 2018

(65) Prior Publication Data
US 2019/0309833 A1 Oct. 10, 2019

(30) Foreign Application Priority Data
Dec. 1, 2016 (DE) ...................... 10 2016 223 922.8

(51) Int. Cl.
*F16H 15/38* (2006.01)
(52) U.S. Cl.
CPC .................................... *F16H 15/38* (2013.01)
(58) Field of Classification Search
CPC .... F16H 15/38; F16H 2015/386; F16H 15/32; F16H 15/36
See application file for complete search history.

(56) References Cited

U.S. PATENT DOCUMENTS

| 2,057,136 A | 10/1936 | Criswell |
| 2,140,012 A | 12/1938 | Hayes |

(Continued)

FOREIGN PATENT DOCUMENTS

| DE | 697 09 515 T2 | 8/2002 |
| DE | 10 2016 111 740 A1 | 12/2017 |

(Continued)

OTHER PUBLICATIONS

Search report for German Patent Application No. 10 2016 223 922.8, dated Sep. 27, 2017.

(Continued)

*Primary Examiner* — David M Fenstermacher
(74) *Attorney, Agent, or Firm* — Pearl Cohen Zedek Latzer Baratz LLP

(57) ABSTRACT

Traction transmission having a first and a second component transmission (26a, b) which are of mirror-symmetrical construction with respect to one another and are arranged axially adjacently in a housing (12), in each case comprising—an axially inner drive friction disc (28a, b) and an axially outer complementary friction disc (32a, b) which are arranged coaxially and can be rotated relative to one another about a transmission central axis, and—a set of friction rollers (40) which make non-positive contact between the friction discs (28a, b, 32a, b) and are mounted such that they can be rotated about in each case one roller axle (44), wherein the roller axles (44) are pivotably mounted in a manner which is spaced apart radially from the transmission central axis on a star-shaped spider (38a, b) which can be moved ax Lilly in relation to the transmission central axis, wherein the spiders (38a, b) are arranged on a common spider sleeve (50) and are coupled to one another at a variable spacing via an axially extending thread pairing (52), wherein—the complementary friction discs (32a, b) are (Continued)

arranged fixedly on a common output shaft (34) which is mounted in the housing such that it is fixed axially and can be rotated, —the spacing of the drive friction discs (28a, b) from one another can be varied by means of a spacing setting device (60), and—the spider sleeve (50) is mounted such that it can be displaced axially relative to the housing (12), wherein the first spider (38a) which is assigned to the first component transmission (26a) is connected fixedly to the housing (12) so as to rotate with it, the second spider (38b) which is assigned to the second component transmission (26b) can be rotated relative to the housing (12) by means of an angular position setting device (54b, 58), and the thread pairing (52) which couples the spiders (38a, b) is set up in such a way that a relative rotation of the spiders (38a, b) brings about a change in the spacing thereof.

13 Claims, 6 Drawing Sheets

(56) References Cited

U.S. PATENT DOCUMENTS

| | | | |
|---|---|---|---|
| 3,394,617 A | 7/1968 | Dickenbrock | |
| 4,339,966 A * | 7/1982 | Kraus | F16H 15/38 476/10 |
| 6,053,841 A | 4/2000 | Koide et al. | |
| 7,166,056 B2 * | 1/2007 | Miller | B62M 11/14 476/37 |
| RE41,892 E * | 10/2010 | Miller | B62K 3/002 476/38 |
| 7,951,041 B2 * | 5/2011 | Dutson | F16H 15/38 476/40 |
| 8,393,989 B2 * | 3/2013 | Pohl | F16H 15/28 475/196 |
| 8,469,856 B2 * | 6/2013 | Thomassy | F16H 15/503 476/40 |
| 8,535,199 B2 * | 9/2013 | Lohr | F16H 15/40 476/38 |
| 8,641,577 B2 * | 2/2014 | Nichols | F16H 15/503 476/38 |
| 8,900,085 B2 * | 12/2014 | Pohl | F16H 63/067 475/189 |
| 10,458,526 B2 * | 10/2019 | Nichols | F16H 61/6646 |
| 10,519,852 B2 * | 12/2019 | Shawe | F02B 39/12 |
| 10,533,645 B2 * | 1/2020 | De Freitas | F16H 15/40 |
| 10,655,551 B2 * | 5/2020 | Shawe | F02B 33/34 |
| 2007/0270269 A1 | 11/2007 | Miller et al. | |
| 2011/0118071 A1 | 5/2011 | De Maziere | |
| 2015/0108767 A1 | 4/2015 | Winslow | |

FOREIGN PATENT DOCUMENTS

| | | |
|---|---|---|
| EP | 1 132 650 A1 | 9/2001 |
| JP | S 6280349 A | 4/1987 |
| JP | H06 185590 A | 7/1994 |
| JP | H 0719308 A | 1/1995 |
| JP | H 10148245 A | 6/1998 |
| JP | 2010 190381 A | 9/2010 |
| JP | 2011522188 | 7/2011 |
| WO | WO 2009/146748 A1 | 12/2009 |
| WO | WO 2011/022076 A | 2/2011 |
| WO | WO 2012/174684 A1 | 12/2012 |

OTHER PUBLICATIONS

International Search Report of PCT Application No. PCT/EP2017/79335, dated Feb. 8, 2018.

* cited by examiner

TRACTION TRANSMISSION AND DRIVE UNIT FOR A MOTOR VEHICLE

CROSS-REFERENCE TO RELATED APPLICATIONS

This application is a National Phase Application of PCT International Application No. PCT/EP2017/079335, International Filing Date Nov. 15, 2017, claiming priority of German Patent Application No. 10 2016 223 922.8, filed Dec. 1, 2016, which is hereby incorporated by reference.

FIELD OF THE INVENTION

The present invention relates to a traction transmission having a first and a second component transmission, which are designed to be mirror-symmetric relative to each other and are configured axially adjacently in a housing, each including

- an axially inner drive friction disc and an axially outer complementary friction disc, that are configured coaxially and mutually rotatably about a transmission central axis, as well as
- a set of friction rollers are non-positively contacted between the friction discs and are each rotationally supported about a roller axle; while being radially spaced apart from the transmission central axis, the roller axles being pivotably supported on a star-shaped spider that is axially movable relative to the transmission central axis, the spiders being configured on a common spider sleeve and mutually spacing-variably coupled via an axially extending thread pairing.

The present invention also relates to a drive unit for a motor vehicle, including such a traction transmission, as well as an electrical machine having a stator and a rotor which is pivotally mounted, radially within the stator.

BACKGROUND OF THE INVENTION

Traction transmissions and drive units of the aforementioned type are described in the non-prepublished German Patent Application DE 10 2016 111 740.4.

The basic form of a traction transmission having two friction discs that are rotatable about a common disc axis, and having friction rollers non-positively engaged between mutually opposing concave friction surfaces of the friction discs has been known for quite some time. By varying the roller angle, it is thereby possible to realize infinitely variable transmission ratios between the friction discs. In the case of conventional toroidal transmissions, the concave friction surfaces of the friction discs are dome-shaped. However, this leads to a drilling motion at the point of contact between the rollers and friction surface, i.e., to a rotary motion component about the contact normal.

One skilled in the art knows of a condition, which, when satisfied, causes the drilling motion to disappear. This is the case when the roller axis, the disc axis and the surface line of the point of contact between the rollers and the friction surface intersect at a point. The surface line of the point of contact is understood to be the vertical to the contact normal in the section plane spanned by the roller axis and the disc axis. Traction transmissions, which, unlike conventional toroidal transmissions, satisfy this condition in all rotational positions of the rollers, are known to one skilled in the art as what are generally referred to as tractrix transmissions, as described in the World Patent Application WO 2009/146748 A1. The German Patent Application mentioned at the outset likewise describes a drilling motion-free alternative to the tractrix transmission. The present invention is preferably implemented using the friction surface form of the last-mentioned type of traction transmission; however, it is not limited thereto, but may, in particular, also be implemented using conventional toroidal transmissions based on full- or half-toroidal designs.

The mentioned German Patent Application discusses a drive unit for a motor vehicle that includes an electrical machine as the drive assembly thereof. Although electrical machines allow a largely efficient operation in a much broader speed range than combustion engines; to enhance efficiency, it may be useful to connect a downstream transmission unit, which, even in the case of electrical drive units, is to be configured as a continuously variable transmission (CVT transmission) in order not to affect the smooth driving feel typically associated with electric operation. The above-mentioned German Patent Application describes a transmission unit that is composed of two axially mirror-symmetrically configured component transmissions. The two component transmissions are mutually, indirectly axially adjacent, namely disposed on both sides of the electrical machine. The mutually facing sides of the component transmission will be referred to here as being axially inner. The mutually opposing sides of the component transmission will be referred to here as being axially outer.

Disposed axially inwardly in each component transmission is a drive friction disc that is connected to the rotor and opposes a corresponding complementary friction disc at the axially outer end of the particular component transmission. In the case of the known specific embodiment, the complementary friction disc is torsionally fixed to the housing and, in particular, may be axially displaced by a hydraulic unit. Positioned between the two friction discs is a star-shaped spider which bears a plurality of pivotable friction rollers. The friction rollers engage non-positively with the friction surfaces of the drive friction disc or the complementary friction disc and are pivotable in each case about a tangentially oriented swivel axis. A rotation of the drive friction disc is transmitted non-positively to the friction rollers and to the spider, the speed thereof being a function of the currently set transmission ratio, which, in turn, is derived from the rotational position of the friction rollers and from the diameter relation of the contact lines thereof with the drive friction disc and the complementary friction disc. Thus, the spider serves as an output drive element or output element of each component transmission.

To adjust the transmission ratio, it is necessary to axially displace the spider within the component transmission assigned thereto (and to readjust the complementary friction disc accordingly in response to the hydraulics thereof). In this case, the mutual spacing of the two spiders changes. In order to jointly fulfill these requirements, both spiders are disposed on a common spider sleeve that serves as an output shaft; however, the spider sleeve is composed of two axial portions that are mutually coupled for corotation and axially displaceable. These axial portions formed as hollow shafts each bear an internal thread in the interior thereof, which threadedly receive a common threaded bolt. Due to the mirror symmetrical design of the thread in the two component transmissions, a rotation of the threaded bolt leads to a mirror symmetric axial displacement of the two axial portions of the spider sleeve relative to one another and thus to a symmetric variation of the spider spacing. To adjust the angular position of the threaded bolt relative to the axial portions of the spider sleeve, the spider sleeve and the threaded bolt are mutually coupled via a differential transmission, to whose output shaft, a servomotor is connected. Thus, an actuation of the servomotor causes the threaded bolt to rotate relative to the spider sleeve, whose two axial portions subsequently modify the spacing therebetween, so that the spiders within the respective component transmission are symmetrically displaced relative to one another, which, in the case of a suitable readjustment of the complementary friction discs, leads to the desired change in the transmission ratio.

The described drive unit is disadvantageously space intensive, especially because of the differential transmission required for adjustment purposes. In addition, the design is considerably complex, so that the described unit is relatively expensive.

SUMMARY OF THE INVENTION

It is an object of the present invention to provide an improved design for a traction transmission of the species and for a drive unit of the species in a way that will reduce the space requirements and the complexity of the design.

In conjunction with the features set forth in the preamble of claim 1, this objective is achieved by fixedly mounting the complementary friction discs on a common and axially fixed output shaft that is rotationally supported in the housing,
 the complementary friction discs being fixedly mounted on a common output shaft that is supported in the housing axially fixedly and rotationally,
 the mutual spacing of the drive friction discs being variable by a spacing setting device, and
 the spider sleeve being supported axially displaceably relative to the housing,
the first spider associated with the first component transmission being connected to the housing for corotation therewith, the second spider associated with the second component transmission being rotatable relative to the housing via an angular position setting device, and the thread pairing coupling the spiders being adapted in such a way that a relative rotation of the spiders effects a change in the spacing thereof.

The objective is also achieved by a drive unit in accordance with claim 12.

Preferred specific embodiments of the present invention constitute the subject matter of the dependent claims.

The underlying mirror-symmetric design is retained in the case of the traction transmission according to the present invention. However, the functional significance of the various elements is altered. The axially inner friction discs do in fact still serve as drive friction discs; however, the present invention provides that the complementary friction discs serve as output friction discs. Therefore, they must be rotatably mounted relative to the housing. However, there is no longer a need for the complementary friction discs to be axially displaceable. Rather, the complementary or output friction discs are supported axially fixedly on a common, output shaft. With the interposition of the common output shaft, the axial forces, which act axially outwardly on the complementary friction discs, cancel each other out. This eliminates the need for an axial supporting on the housing.

To realize the spacing variation between the friction discs of a component transmission associated with each transmission ratio adjustment, the drive friction discs must be configured to be spacing-variable, however. As is to be described further below in greater detail on the basis of preferred exemplary embodiments, it is possible in this regard to place a corresponding setting device directly between the mutually adjacent drive friction discs, which are braced on both sides against these friction discs, so that, here as well, there is no need for axial force-based bracing on the housing.

Finally, the present invention provides that the spider sleeve, which bears the two spiders, as such, be supported axially displaceably relative to the housing. In terms of design, this is readily accomplished since, in the context of the present invention, apart from any torsional twisting, no rotation of the spider sleeve relative to the housing is provided. A twisting capacity of the spiders relative to one another is merely provided for adjustment purposes; this relative twisting is translated by the threaded coupling into a change in spacing of the spiders. Various simple designs are conceivable here.

A preferred specific embodiment of the present invention provides that the spider sleeve be configured as an inherently torsionally stiff unit and, in the area of a component transmission, bear an external thread on which is screwed the associated spider, which bears a corresponding internal thread. In particular, it may be provided that the spider, which is referred to here as the first spider and is connected to the housing for corotation therewith, also be fixed to the spider sleeve. Thus, the spider sleeve is likewise supported on the housing for corotation therewith. On the other hand, the spider, which is referred to here as the second spider and is rotatable relative to the housing by the angular position setting device, is screwed onto the external thread of the spider sleeve. In the terminology of claim 1, this signifies that the component transmission, in whose area the spider sleeve bears the external thread, is the second component transmission. Alternatively, the (second) spider that is rotatable relative to the housing may also be fixedly connected to the spider sleeve, while the (first) spider, which is mounted to the housing for corotation therewith, is screwed onto the spider sleeve. In this case, the spider sleeve would corotate in response to a rotation of the second spider. Again, it is also alternatively conceivable to form the spider sleeve as two axial portions that are bolted to one another by a corresponding longitudinal thread, each axial portion bearing a spider that is fixedly connected thereto. In all cases, a torsional twisting of the second spider leads to a change in the spacing of the two spiders from one another. When the non-positive connection between the friction discs and the friction rollers is retained by the spacing setting device suitably axially readjusting the axially displaceable drive friction discs, the spacing adjustment of the spiders leads to a self-centering of the spider sleeve while the friction-roller pivot position is simultaneously automatically adapted to the corresponding change in the transmission ratio.

Thus, the present invention provides a transmission module, whose transmission ratio may be adjusted by simply adjusting the torsion of a spider, and in which all axial and radial forces cancel each other out, making possible an easier, outwardly force-free installation into a more complex drive unit.

With regard to the angular position setting device for adjusting the torsion of the second spider, it is preferably provided that the angular position setting device have an adjusting sleeve, which is coupled to an actuator, is disposed coaxially to the transmission central axis, and is pivotally mounted to the housing, embraces the associated complementary friction disc axially from the outside, and features axially inwardly extending adjusting fingers, which, in pairs, each rotationally fix a projection of the associated spider that extends radially beyond the pivot bearing of a roller axle. The adjusting sleeve may essentially have the form of a hollow cylinder having an axially slotted inner wall, the inner wall slots opening axially inwardly. The angular spacing of the slots or of the fingers forming the same must be adapted to that of the rays of the star-shaped spider. As fundamentally known from the related art, each spider ray supports a pivotable friction roller. The preferred embodiment of the present invention described here provides that each spider ray extend with a radial projection beyond the pivot bearing of each friction roller. These projections serve as a point of application for the adjusting sleeve. In particular, they are to be located within the adjusting sleeve slots described above and engage slidingly on the fingers forming the slot. Thus, via this driving mechanism, a rotation of the adjusting sleeve leads to a corresponding rotation of the second spider, which, however, is able to follow the axial movement of the adjusting sleeve within the axial adjusting sleeve slot, with the interposition of the thread pairing of the spider sleeve. The first spider is preferably rotationally fixed by a similar sleeve that, in this case, is housing-mounted, however, and is, therefore, not to be referred to as an adjusting sleeve, rather as a positioning sleeve.

As mentioned at the outset, the drive friction discs may be coupled to a drive assembly. A preferred specific embodiment of the present invention provides that (only) one of the drive friction discs bear a coupling device for coupling this drive friction disc to the drive assembly and be connected via a torque-transmitting coupling device to the other drive friction disc. It is, in fact, also fundamentally possible to provide each of the drive friction discs with such a coupling device; however, this only seems to be indicated when no relative rotation whatsoever is intended between the two drive discs.

However, an especially advantageous specific embodiment of the present invention provides that the coupling device and the spacing setting device be jointly formed as a rolling element/ramp coupling. This coupling type, which is fundamentally known to one skilled in the art, combines a transmission of torque with a spacing adjustment of the mutually coupled elements (here, of the drive friction discs). Two elements coupled in this manner do, in fact, rotate with fundamentally the same speed; in the case of a torque change, however, a slight relative displacement quickly results. This would not be possible in the case of a separate coupling of each drive friction disc with the drive assembly. For this reason, the coupling explained above between only one drive friction disc and the drive assembly is preferred. Such a coupling may, for example, be in the form of a spline toothing, which, in fact, ensures a torque transfer of the coupled drive friction disc; at the same time, however, does not prevent the axial displaceability thereof.

To form the preferred rolling element/ramp coupling, it may be provided that, on the surface thereof facing the other drive friction disc, at least one of the drive friction discs have a circumferentially varying ramp profile, and that an annular disc-shaped cage be supported between the drive friction discs upon which a plurality of rolling elements resting against the ramp profile are mounted that are rotatable in each case about a radial rolling axis. Fundamentally conceivable is also a direct mounting of the rolling elements on the friction disc that is not reinforced by the ramp profile; structurally simpler, however, is the variant described here of a separate cage as the carrier of the rolling elements. This specific embodiment also has the advantage that both drive friction discs may be provided with a ramp profile on the mutually facing surfaces thereof, making it possible to realize a larger spacing displacement and, in particular in cases of a torque reversal, to avoid significant slackness.

On the basis of the above explanations, one skilled in the art will have understood that the form of the ramps and the form of the friction surfaces must be matched in such a way that the spacing between the drive friction discs and, therefore, also the spacing between the drive fiction disc and the complementary friction disc of each component transmission ensures a correct contact force between the friction discs and the friction rollers at each angular position of the friction rollers. To also avoid an initial spinning when driving off and/or to avoid undefined states, it is preferably provided that the friction discs and friction rollers make non-positive contact with each other even when the traction transmission according to the present invention is at a standstill. As preferably provided, this may be achieved by the drive friction discs being pretensioned by a spring device that is configured therebetween and is braced on both sides against them in the direction of the complementary friction disc associated therewith in each case. Such a spring device is preferably designed as an annular disc-shaped diaphragm spring system.

In a preferred refinement of this specific embodiment, the partial spring system features an internal toothing, into which a corresponding external toothing of the cage bearing the rolling elements engages. This also curtails slackness in the case of a torque reversal.

As already mentioned at the outset, the specific form of the friction surfaces is not relevant to the invention here. The described self-centering mechanism of the spiders generally functions for every practical friction surface form, as are known for various traction transmissions. However, with regard to the attainable freedom from drilling friction, it is very preferably provided that the friction surfaces of the friction discs, as well as of the rollers be formed in such a way that, regardless of the rotational position of the rollers, the surface lines of the two contact points of each roller of a component transmission intersect at a point with the particular roller axis and the transmission central axis. There is no closed analytical expression that may be stated for such a friction surface form. However, for each individual case, such friction discs may be constructed using methods of analytical geometry generally known to one skilled in the art.

An especially preferred field of application of a traction transmission according to the present invention is a drive unit of a motor vehicle, in particular an electrical drive unit of an electric-powered or hybrid-traction vehicle. Such a drive unit typically includes an electrical machine configured as an internal-rotor motor having a stator and a rotor that is radially, rotatably mounted within the stator. The rotor preferably features an internal spline toothing, which is in toothed engagement with an external spline toothing, which the coupling device of the traction transmission, in particular the drive friction disc thereof, is designed as. The traction transmission may thereby reside radially within the rotor, resulting in a considerable savings of axial installation space in comparison to variants having an axial configuration of the drive assembly and transmission.

BRIEF DESCRIPTION OF THE DRAWINGS

Other features and advantages of the present invention will become apparent from the following special description and drawings, whose.

Identical reference numerals in the figures indicate the same or analogous elements.

DETAILED DESCRIPTION OF THE INVENTION

FIG. 1 through 8 represent a specific embodiment of a drive unit according to the present invention, respectively individual components thereof. In this respect, the following explanations relate to all of the figures collectively. Only where individual aspects in individual figures are illustrated with exceptional clarity, is reference made explicitly to these figures.

Figure 1:
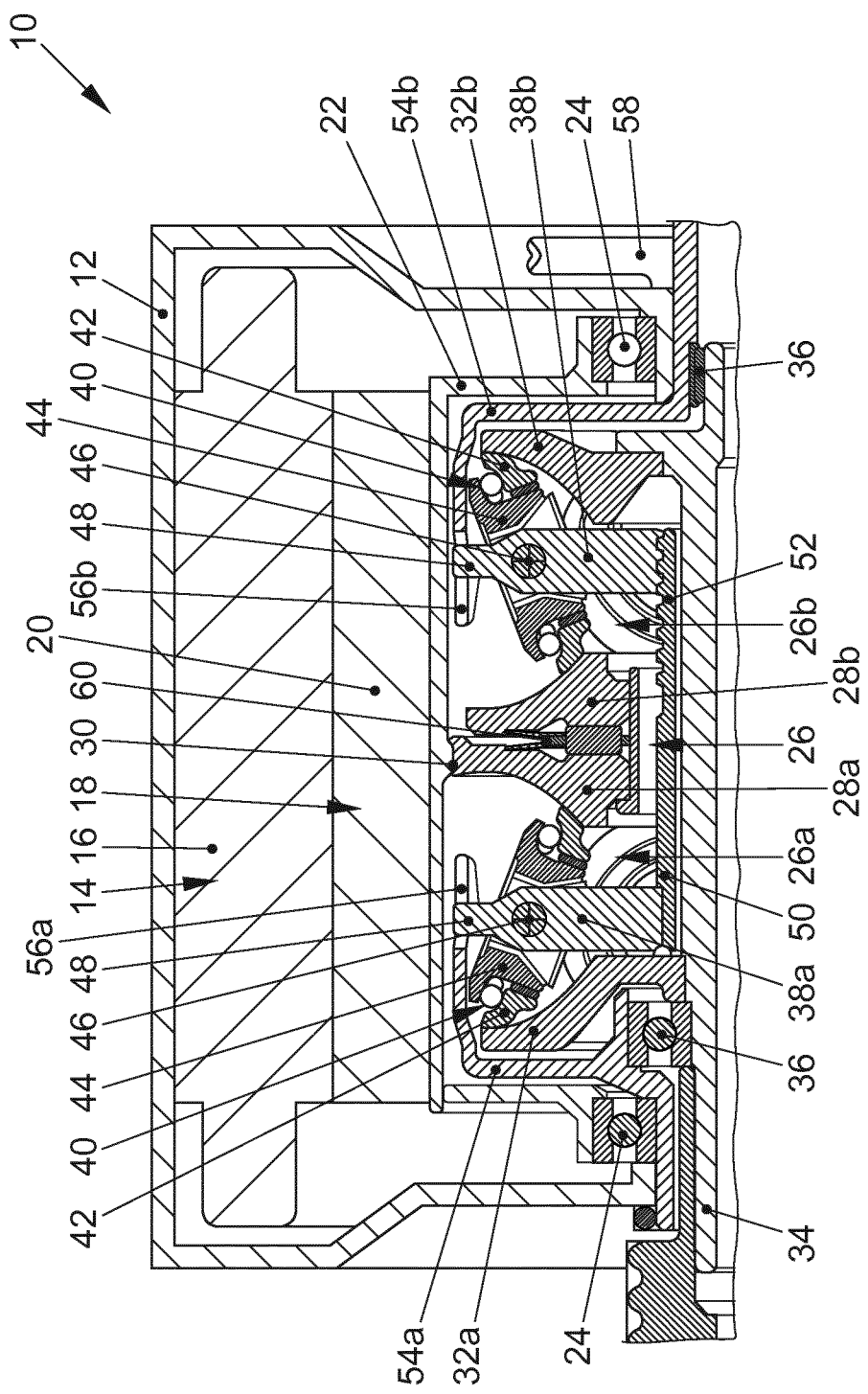
FIG. 1: shows a sectional view through a specific embodiment of a drive unit according to the present invention.

The sectional representation of FIG. 1 provides an overview of the basic design of drive unit 10. Disposed in a housing 12 is an electrical machine 14 which is configured as an internal-rotor motor, has a housing-mounted stator 16 and a rotor 18 that is radially rotatable within stator 16. In the illustrated specific embodiment, rotor 18 is composed of an electrically active part 20 and of a rotor shaft 22, which is supported against housing 12 directly by rotor bearing 24 (right rotor bearing), respectively indirectly (left rotor bearing). Rotor shaft 22 is used as the input shaft of traction transmission 26, which is disposed radially within rotor 18 and is shown separately in isolation in FIGS. 6 and 7.

Traction transmission 26 is assembled from two component transmissions, namely first component transmission 26a illustrated on the left in FIG. 1 and second component transmission 26b illustrated on the right in FIG. 1. The two component transmissions 26a, 26b are designed to be mirror-symmetric relative to each other and are configured axially adjacently. Drive friction discs 28a,b of component transmission 26a,b are positioned axially inwardly, i.e., in the center in FIG. 1. First drive friction disc 28a associated with first component transmission 26a is connected to rotor shaft 22 by a straight-toothed spline toothing 30. In this way, a torsionally fixed coupling is realized between rotor shaft 22 and first drive friction disc 28a, which, however, permits an axial displacement of first drive friction disc 28a. Disposed axially outwardly, i.e., opposing drive friction discs 28a,b in each component transmission 26a,b, respectively, are complementary friction discs 32a,b, which function as output friction discs in the case of traction transmission 26 according to the present invention. Output friction discs 32a,b are fixedly connected to an output shaft 34, which is mounted indirectly on housing 12 via output shaft bearing 36.

Disposed between the mutually associated friction discs of each component transmission 26a,b is one spider 38a,b each, which essentially is star-shaped and, on each of the rays thereof, bears a friction roller 40, which in the illustrated specific embodiment has a friction ring 42, which is rotationally mounted about a roller axle 44 and non-positively contacts drive friction discs and output friction discs 28a,b, 32a,b associated therewith. Roller axle 44 is rotationally mounted on spider 38a, 38b about a pivot 46. The rays of spider 38a,b bearing a friction roller 40 in each case extend with a radial projection 48 radially beyond pivot 46.

Figure 2:
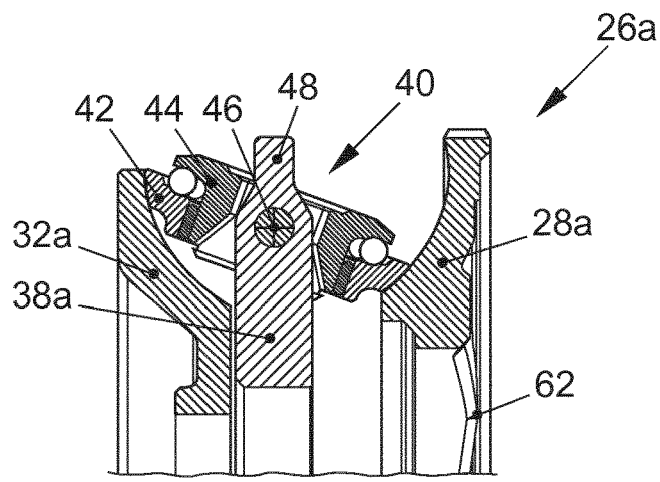
FIG. 2: is a detail view of the left roller suspension of FIG. 1 in a first rotational position.
Figure 3:
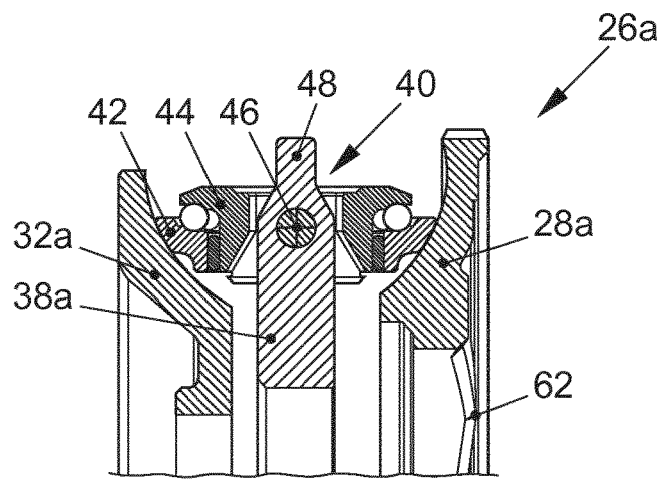
FIG. 3: shows the roller suspension of FIG. 2 in a second rotational position.
Figure 4:
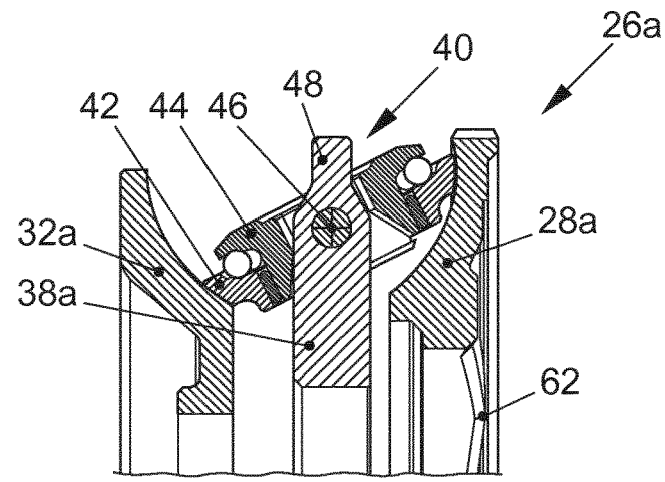
FIG. 4: shows the roller suspension of FIG. 2 in a third rotational position.
Figure 5:
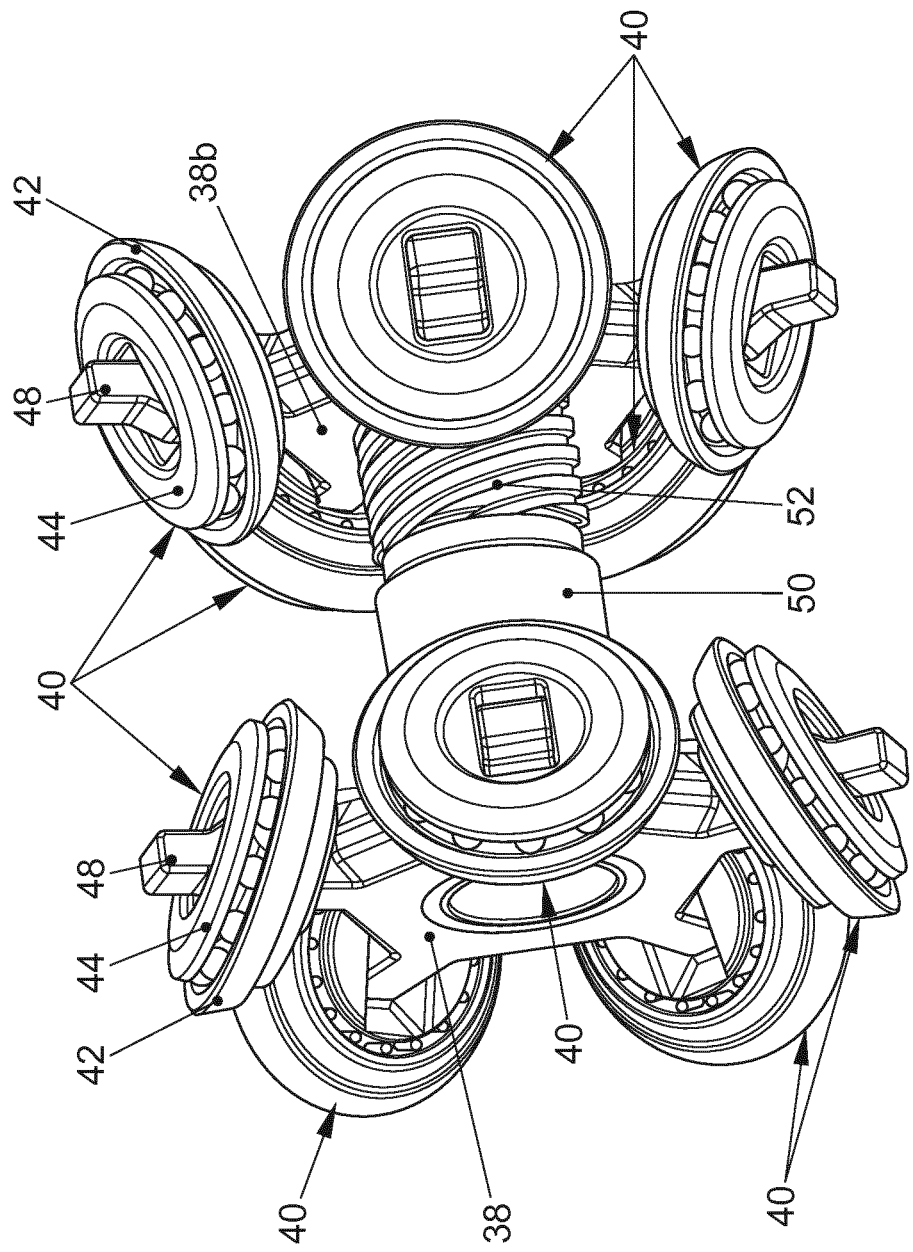
FIG. 5: is a perspective view of the spiders of the drive unit from FIG. 1.

In FIG. 2 through 4, the suspension of a friction roller 40 on first spider 38a is shown in an enlarged view in three different rotational positions. It is also discernible in FIG. 2 through 4 that, associated with each change in angular position of friction roller 40 is an axial displacement of spider 38a, as well as of associated drive fiction disc 28a relative to housing 12, respectively to housing-mounted output friction disc 32a. These axial displacements are necessary in order to maintain the non-positive connection among friction discs 28a, 32a and friction roller 40. The change in the transmission ratio in component transmission 26a between drive fiction disc 28a thereof and output friction disc 32a thereof that accompanies this change in angular position and axial displacement is readily discernible to one skilled in the art.

It is self-evident that said changes in the transmission ratio must be carried out synchronously in both component transmissions 26a,b. Therefore, the two spiders 38a,b are interconnected by a common spider sleeve 50. In the illustrated specific embodiment, first spider 38a is fixedly connected to spider sleeve 50, while second spider 38b bears an internal thread that is screwed onto an external threaded portion 52 of spider sleeve 50. Spider sleeve 50 formed as a hollow shaft wraps coaxially around output shaft 34 and is subject to a radial mounting via friction rollers 40. In contrast, it is not axially fixed, rather is axially displaceable relative to housing 12. Such an axial displacement of spider sleeve 50 results in a unidirectional displacement of spiders 38a,b, whereas a rotation of spiders 38a,b relative to one another due to threaded coupling 52 results in a change in spacing between spiders 38a,b. The two spiders 38a,b, together with friction rollers 40 and common spider sleeve 50, are shown in FIG. 5 again in an isolated view.

To effect a relative rotation of spiders 38a,b, as is provided for purposes of a change in the transmission ratio, traction transmission 26 features a positioning sleeve 54a in the area of first component transmission 26a thereof and an adjusting sleeve 54b in the area of second component transmission 26b thereof. These are very readily apparent in FIGS. 6 and 7, which show two representations of isolated traction transmission 26. Positioning sleeve 54a is fixedly connected to housing 12 and, in the illustrated specific embodiment, supports left rotor-shaft bearing 24. Positioning sleeve 54a wraps around first output friction disc 32a axially from the outside and has radially inwardly extending positioning fingers 56a which rotationally fix projections 48 of first spider 38a, the axial displaceability of spider 38a not being hindered, however. Adjusting sleeve 54b in the area of second component transmission 26b is constructed and positioned accordingly, but not coupled to housing 12 for corotation therewith. Rather, it is connected by an angular position setting device 58 to an actuator not shown in the figures. Thus, this actuator may effect a specific rotation of second spider 38b relative to first spider 38a, and thus a selective change in spacing between spiders 38a, b in relation to each other.

Generating a controlled change in transmission ratio herefrom requires a compensating axial displacement of the two drive fiction discs 28a,b, so that the non-positive connection among friction discs 28a,b, 32a,b and friction rollers 40 in every component transmission is retained. One skilled in the art will recognize that an axial displacement of drive fiction discs 28a,b that is compensating in this manner effects a correspondingly compensating axial displacement of spider sleeve 52 and thus a self-centering of spiders 38a,b within respective component transmission 26a,b thereof.

Figure 8:
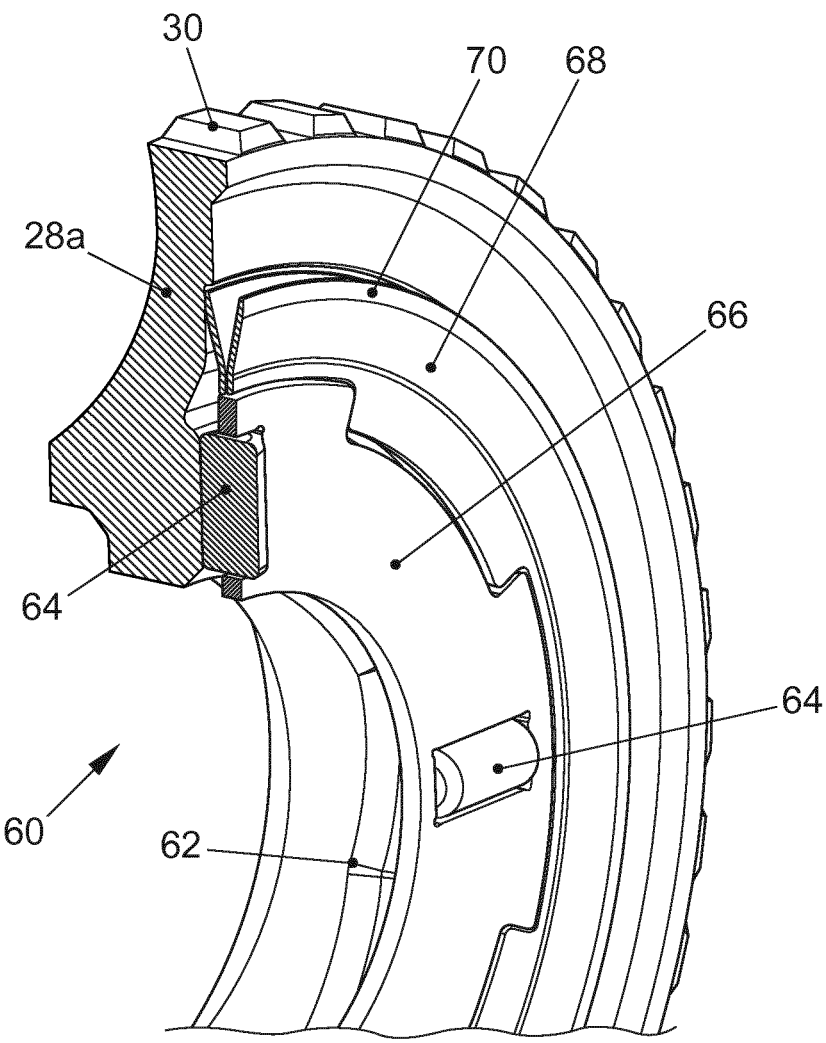

To realize the compensating axial displacement of drive fiction discs 28a,b, a torque-dependent rolling element/ramp coupling 60 is provided between drive fiction discs 28a,b, which is readily apparent in the illustration of FIG. 8, in particular. The object of coupling 60, on the one hand, is the transmission of the rotor torque from first drive fiction disc 28a to second drive fiction disc 28b and, on the other hand, the aforementioned, compensating axial displacement of drive friction discs 28a,b relative to one another or relative to output friction discs 32a,b associated therewith in each case. To this end, drive fiction discs 28a,b are each provided at the mutually facing surfaces thereof with a circumferentially varying ramp profile 62. FIG. 8 merely shows ramp profile 62 of first drive fiction disc 28a. Disposed on ramp profiles 62 are rolling elements 64, which, in the illustrated specific embodiment, are rotationally mounted in a separate cage 66 about a radial axis of rotation. In the illustrated specific embodiment, rolling elements 64 have the form of rollers. Spherical rolling elements are likewise conceivable. The spacing of drive friction discs 28a, b from one another changes as a function of the relative position of the mountains and valleys of ramp profiles 62, on the one hand, and of rolling elements 64, on the other hand. The relative rotation of drive friction discs 28a,b required for this purpose is a function of the transmitted torque, which is determined, in particular, by the pressure force applied by the friction rollers on drive fiction discs 28a,b. Cage 66 is in toothed engagement with an annular disc-shaped diaphragm spring system 68, which is braced on both sides on drive friction discs 28a,b, pretensioning them in the direction of respectively associated output friction discs 32a,b. A basic tension is hereby produced in each component transmission 26a,b, which avoids undefined states or a slipping upon starting. To reduce wear, diaphragm spring system 68 has an anti-friction coating 70 on each of the ring-shaped contact surfaces thereof on drive friction discs 28a,b. The toothed engagement of cage 66 with diaphragm spring system 68 makes it possible for the slackness in response to a torque reversal between drive friction discs 28a,b to be kept to an especially low level.

Figure 6:
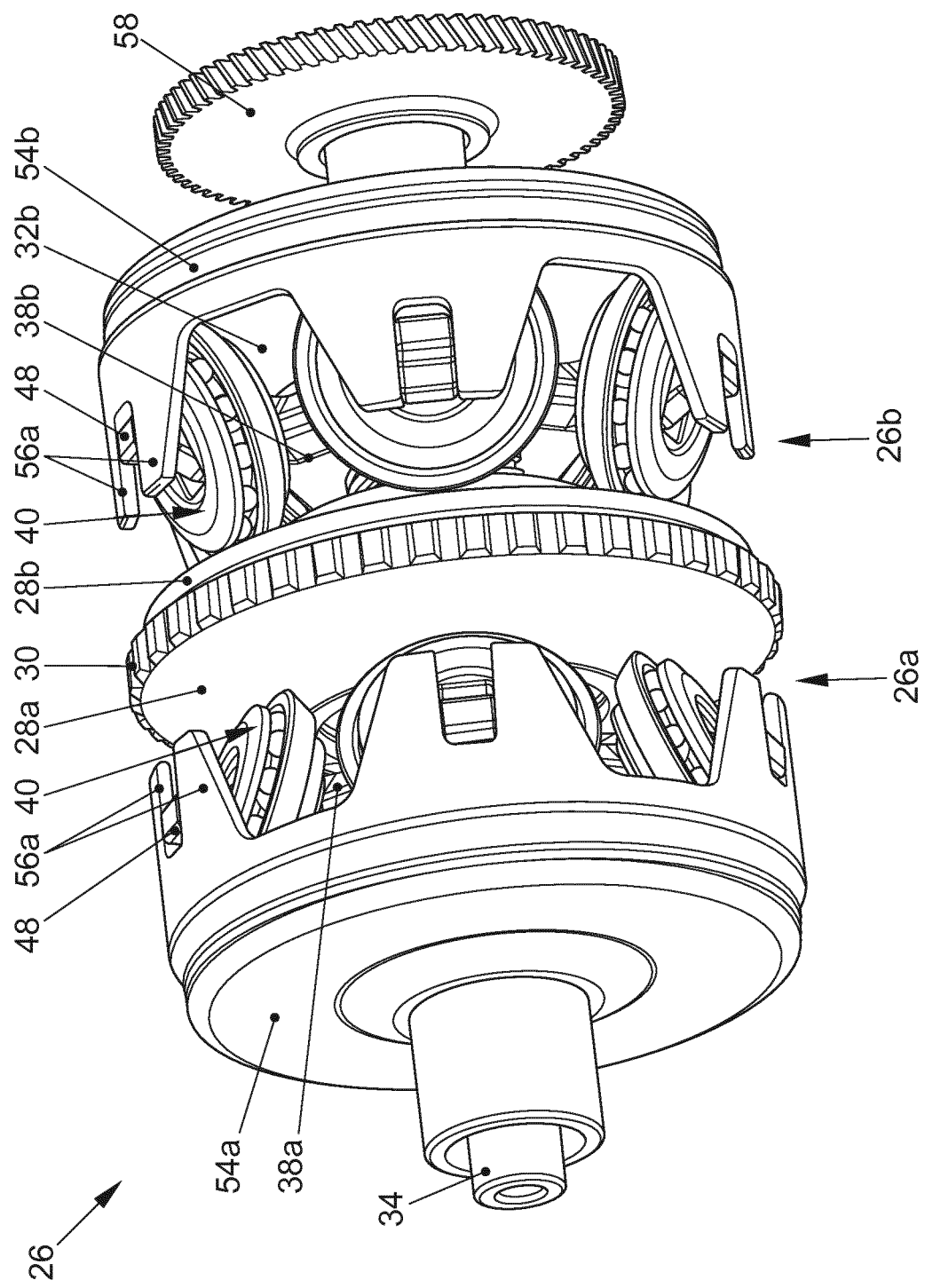
FIG. 6: is a perspective view of a specific embodiment of a traction transmission according to the present invention, in particular of the traction transmission of the drive unit of FIG. 1.
Figure 7:
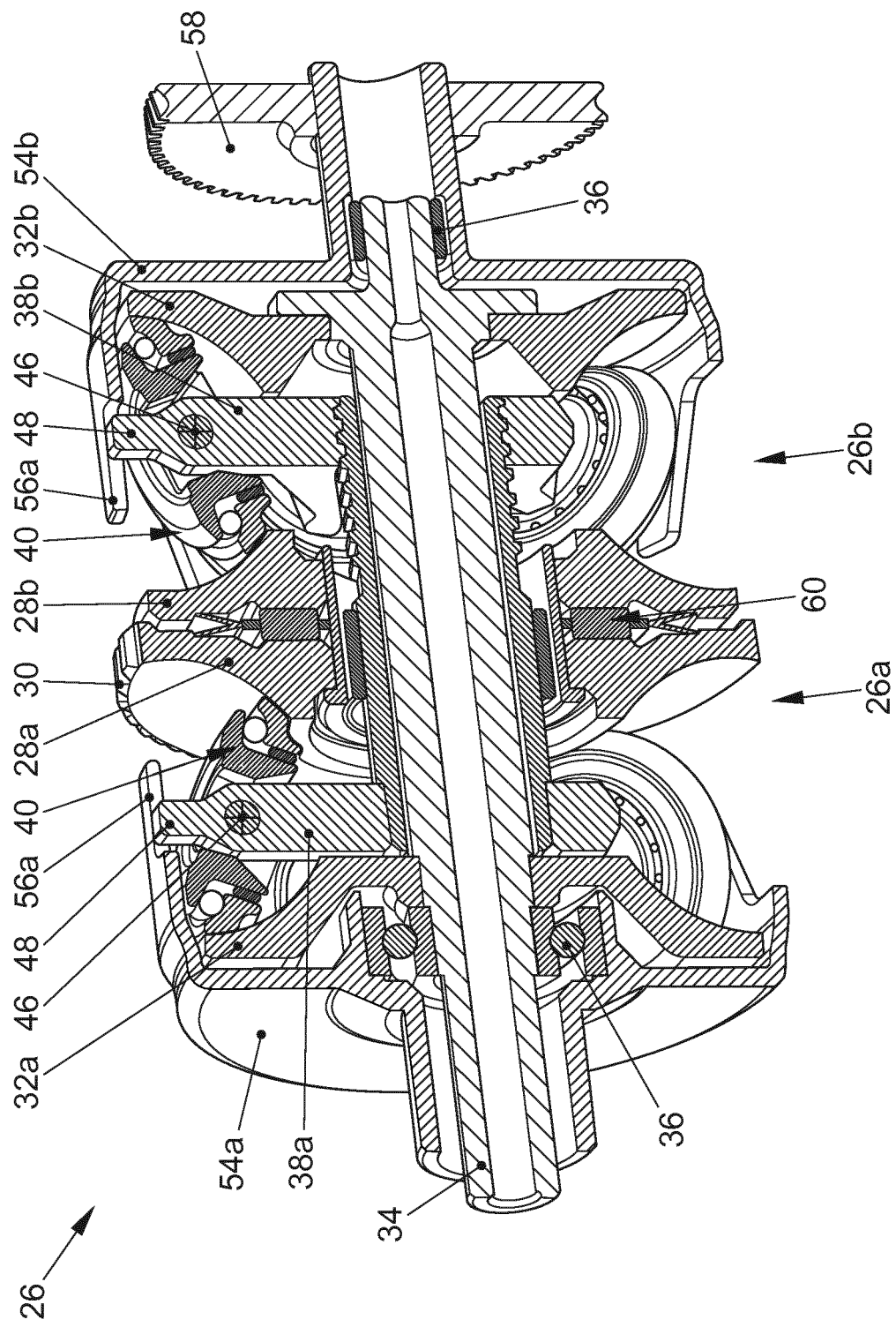
FIG. 7: is a cut-away, perspective view of the traction transmission of FIG. 6, and FIG. 8: is a cut-away, perspective view of the coupling and spacing setting device of the traction transmission from FIG. 6.

It will be apparent to one skilled in the art that the traction transmission according to the present invention, as illustrated, in particular, in FIGS. 6 and 7, is shown as an externally axial force- and radial force-free unit, since all of the axial and radial force components inside of transmission 26 cancel each other out. Therefore, there will only be torques that are introduced and removed, making a modular installation possible without special bracing in the housing.

It is self-evident that the specific embodiments discussed in the special description and shown in the figures only describe illustrative exemplary embodiments of the present invention. In light of the present disclosure, a broad spectrum of possible variations will be obvious to one skilled in the art.

REFERENCE NUMERAL LIST

10 drive unit
12 housing
14 electrical machine
16 stator
18 rotor
20 electrically active part of 18
22 rotor shaft
24 rotor-shaft bearing
26 traction transmission
26a first component transmission of 26
26b second component transmission of 26
28a first drive fiction disc
28b second drive friction disc
30 spline toothing
32a first complementary friction disc, first output friction disc
32b second complementary friction disc, second output friction disc
34 output shaft
36 output shaft bearing
38a first spider
38b second spider
40 friction roller
42 friction ring
44 roller axle
46 pivot
48 radial projection
50 spider sleeve
52 external thread
54a positioning sleeve
54b adjusting sleeve
56a positioning finger
56b adjusting finger
58 angular position setting device
60 rolling element/ramp coupling
62 ramp profile
64 rolling element
66 cage
68 diaphragm spring system
70 antifriction surface

What is claimed is:

1. A traction transmission having a first and a second component transmission, which are designed to be mirror-symmetric relative to each other and are configured axially adjacently in a housing, each comprising an axially inner drive friction disc and an axially outer complementary friction disc, that are configured coaxially and mutually rotatably about a transmission central axis, as well as a set of friction rollers, which are non-positively contacted between the friction discs and are each rotationally supported about a roller axle, while being radially spaced apart from the transmission central axis, the roller axles being pivotably supported on a star-shaped spider, which is axially movable relative to the transmission central axis, the spiders being configured on a common spider sleeve and mutually spacing-variably coupled via an axially extending thread pairing, the complementary friction discs being fixedly mounted on a common output shaft that is axially fixedly and rotationally supported within the housing, the mutual spacing of the drive friction discs being variable by a spacing setting device, and the spider sleeve being supported axially displaceably relative to the housing, the first spider associated with the first component transmission being connected to the housing for corotation therewith, the second spider associated with the second component transmission being rotatable relative to the housing via an angular position setting device, and the thread pairing coupling the spiders being adapted in such a way that a relative rotation of the spiders effects a change in the spacing thereof.

2. The traction transmission as recited in claim 1, wherein the spider sleeve is configured as an inherently torsionally stiff unit and, in the area of a component transmission, bears an external thread on which is screwed the associated spider, which bears a corresponding internal thread.

3. The traction transmission as recited in claim 2, wherein the component transmission, in whose area the spider sleeve bears the external thread, is the second component transmission.

4. The traction transmission as recited in claim 1, wherein the angular position setting device has an adjusting sleeve, which is coupled to an actuator, is coaxially disposed relative to the transmission central axis, and is pivotally mounted to the housing, embraces the associated complementary friction disc axially from the outside, and has axially inwardly extending adjusting fingers, which, between them in pairs, each rotationally fix a projection of the associated spider) that extends radially beyond the pivot bearing of a roller axle.

5. The traction transmission as recited in claim 1, wherein one of the drive friction discs bears a coupling device for coupling this drive friction disc to a drive assembly and is connected via a torque-transmitting coupling device to the other drive friction disc.

6. The traction transmission as recited in claim 5, wherein the coupling device and the spacing setting device are jointly formed as a rolling element/ramp coupling.

7. The traction transmission as recited in claim 6, wherein, on the surface thereof facing the other drive friction disc, at least one of the drive friction discs has a circumferentially varying ramp profile, and, supported between the drive friction discs, is an annular disc-shaped cage upon which a plurality of rolling elements are mounted, which rest against the ramp profile and are rotatable in each case about a radial rolling axis.

8. The traction transmission as recited in claim 1, wherein the drive friction discs are pretensioned by a spring device that is configured therebetween and is braced on both sides against them in the direction of the complementary friction discs associated therewith in each case.

9. The traction transmission as recited in claim 8, wherein the spring device is designed as an annular disc-shaped diaphragm spring system.

10. The traction transmission as recited in claim 7, wherein the disc-shaped diaphragm spring system has an internal toothing, into which a corresponding external toothing of the cage engages.

11. The traction transmission as recited in claim 1, wherein the friction surfaces of the friction discs, as well as of the rollers, are formed in such a way that, regardless of the rotational position of the rollers, the surface lines of the two contact points of each roller of a component transmission intersect at a point with the particular roller axle and the transmission central axis.

12. A drive unit for a motor vehicle, comprising:
an electrical machine having a stator and a rotor, which is radially, rotatably mounted within the stator, as well as a traction transmission,
wherein the traction transmission is designed in accordance with claim 5, and
wherein the rotor has an internal spline toothing, which is in toothed engagement with an external spline toothing, which the coupling device of the traction transmission is designed as.

13. The traction transmission as recited in claim 9, wherein the disc-shaped diaphragm spring system has an internal toothing, into which a corresponding external toothing of the cage engages.

* * * * *